Patented Apr. 30, 1940

2,199,361

UNITED STATES PATENT OFFICE 2,199,361

SULPHUR COMPOUNDS AND METHOD OF SYNTHESIZING THE SAME

Bert H. Lincoln and Gordon D. Byrkit, Ponca City, Okla., assignors to Continental Oil Company, Ponca City, Okla., a corporation of Delaware No Drawing. Application June 16, 1937, Serial No. 148,514

7 Claims. (Cl. 260—608)

Our invention relates to sulphur compounds and a method of synthesizing the same from olefins.

One object of our invention is to provide a method of synthesizing sulphur compounds such as alkyl dithianes from waste gases normally suitable only for fuel, or from any other source of olefins.

Another object of our invention is to provide organic sulphur compounds having a high content of stably bound sulphur as new compositions of matter.

Another object of our invention is to provide a convenient and inexpensive method of synthesizing liquid and solid compounds of high sulphur content in commercial quantities.

Other and further objects of our invention will appear from the following description.

It is now common practice to vent light hydrocarbon gases formed by the pyrolytic decomposition of hydrocarbon oils to the atmosphere or to use them for fuel. These gases contain many olefinic gases which may be absorbed from the waste gases by sulphuric acid. The higher molecular weight olefins are absorbed by acid of lower concentration and the lower molecular weight olefins are absorbed by more concentrated sulphuric acid. By contacting the olefin-bearing gases with concentrated sulphuric acid, the greater portion of the olefins will be absorbed. The absorbed olefins may be removed from the absorption acid by distillation or the like and purified, if desired, by rectification and fractionation. While we prefer to use olefins from waste gases for economic reasons, it is to be understood that our method is applicable to olefins obtained from any source. If pure sulphur-bearing compounds are desired, the olefins may be obtained in a substantially pure state by selective absorption, rectification and fractionation, as will be understood by those skilled in the art. If sulphur bearing compounds of lower purity are to be produced, we can use mixed olefins from any source or olefin-containing materials such as those contaminated with saturated hydrocarbons.

By way of example and not by way of limitation, we may start with an olefin such as ethylene, propylene or butylene which may have been separated from refinery gases by absorption with sulphuric acid, subsequent rectification and fractionation. The olefin gas is then treated with a free halogen such as chlorine, bromine, iodine or fluorine to form the alkylene dihalide. Chlorine is preferred because of its cheapness and availability. Bromine, if used, is of advantage in that the subsequent syntheses may be carried out with greater ease, but is objectionable because of its expense. When bromine or iodine is used, a halogen recovery system is desirable.

The alkylene dihalide which is formed by the halogenation of the olefin is then treated with an alkali metal hydrosulphide in order to form the alkylene dimercaptan. The alkali metal hydrosulphide may be conveniently prepared by the interaction of the alkali hydroxide with hydrogen sulphide. The caustic may be in an aqueous or alcoholic solution and may be contacted by countercurrent circulation in a packed tower with a stream of hydrogen sulphide or hydrogen sulphide bearing gas. Both the caustic solution and the gas may be recontacted, either by recycling or in a subsequent zone in order to continue the reaction as far as commercially practicable.

The alkali hydrosulphide solution is passed in contact with the alkylene dihalide in a reaction chamber in which the reactants may be under heat and pressure. We prefer to operate at atmospheric pressure but, if an increased speed of reaction is desired, superatmospheric pressure may be employed. It is of advantage to carry out the reaction in the presence of hydrogen sulphide in order to reduce the reaction time and obtain a higher conversion to the dimercaptan. The reaction chamber for example, may be placed under super-atmospheric pressure by means of compressed hydrogen sulphide gas. The pressure may be further increased by the application of heat to a closed reaction chamber. The reaction time, as will be understood by those skilled in the art, will vary according to the conditions of temperature, pressure and the proportions of the reagents. The alkylene dimercaptan which is formed by the reaction may be separated in any suitable manner. For example, if water is used as a solvent for the caustic, the dimercaptan is mechanically separated, since it is insoluble in the aqueous menstruum. If an alcoholic solution of the caustic is used to form the alkali hydrosulphide reagent, the alkylene dimercaptan may be removed by distillation or by dilution with water. Use of an aqueous solution of the alkali hydrosulphide solution permits a more ready separation of the alkylene dimercaptan to be made by settling, filtering, or centrifuging.

The desired high sulphur content compounds may be obtained from the dimercaptans by several methods. For example, we may oxidize the dimercaptans to convert them into cyclic polysulphides, for example, ethylene dimercaptan may be oxidized into diethylene tetrasulphide which contains nearly 70 per cent of sulphur. We may, for example, treat the dimercaptans with chlorine gas or sulphuryl chloride. These reagents are not only cheap but readily available. The reaction may be controlled by dilution of one or both of the reactants. Thus we may bring an undiluted chlorine gas in contact with a solution of the dimercaptan to be converted in an inert solvent such as carbon tetrachloride. Or we may, for example, treat an undiluted mercaptan with a mixture of chlorine and an inert gas such as nitrogen, carbon dioxide, air, or the like. In using sulphuryl chloride, one or both of the reactants may be diluted with carbon tetrachloride or other inert solvent so that, by controlling the concentration of the reactants, the reaction may be controlled.

When purified propylene is used as the olefin, the homologous product, dimethyldiethylenetetrasulphide, which contains over sixty per cent of sulphur, is obtained.

Another method for obtaining compounds rich in sulphur from dimercaptans prepared from pure olefins, comprises treating the dimercaptans with alkylene dihalides and a condensing agent, whereby a cyclic sulphide is formed. For example, ethylene dibromide and ethylene dimercaptan react in the presence of sodium oxide to form dithiane containing over fifty per cent of sulphur. By the condensation reaction of alkylated dimercaptans, substituted dithianes having a high sulphur content will be formed. In this reaction, for example, ethylene dimercaptan may be condensed with propylene dibromide or propylene dimercaptan may be condensed with ethylene dibromide. Mixtures of crude dimercaptans with mixtures of alkylene dibromides may be condensed to form high sulphur content compounds cheaply.

The condensation reaction may be accomplished with other reagents such as dry caustic in inert media.

Alternatively, a metal derivative of the dimercaptan may be formed. For example, the dimercaptan may be treated with sodium plumbite to form the lead derivative which, when treated with an alkylene halide, forms dialkylene disulphides. Sodamide, metallic sodium or metallic calcium may be used to form the metal derivatives of the dimercaptans.

The desired high sulphur content compounds may be separated from the menstruum by distillation, concentration, crystallization or the like. If a menstruum is used in which the desired products are not soluble, the separation may be by settling, filtering or centrifuging.

The dialkylene disulphides may be formed from the alkylene dihalides directly by using an alkali sulphide. Thus, for example, ethylene dibromide may be converted by an alcoholic solution of sodium sulphide to an ethylene sulphide corresponding to the empirical formula $C_2H_4S$ which is probably a polymeric form. On heating this material to a temperature of about 180° to 200° C. it is slowly converted to the dithiane. The conversion may be accomplished by heating with boiling aniline, phenol or the like.

The alkali sulphide reagent required may be conveniently obtained by neutralizing the alkali hydrosulphide solution with an additional amount of caustic equal in general to the amount originally taken. For example, if 80 pounds of caustic is dissolved in alcohol and half of this solution is saturated with hydrogen sulphide, and then the other half of the caustic solution is added, the resultant solution may be used as if it contained the alkali sulphide in solution.

Still another method of converting the alkylene dimercaptans into compounds rich in sulphur comprises their condensation with carbonyl compounds of low molecular weight, as for example, formaldehyde, acetaldehyde, acetone, and the like. By way of example but not by way of limitation, methyl dithiolane, which contains over 50 per cent of sulphur, may be obtained by condensing ethylene dimercaptan with acetaldehyde. In this reaction, dry hydrogen chloride gas may be used as the condensing agent. Likewise, sulphuric acid or zinc chloride may be used, either alone or with hydrogen chloride.

The synthesized compounds are high in sulphur in stably bound form. They may be employed as addition agents in petroleum products such as lubricating oils and greases, for increasing film strength or acting as antioxidation catalysts in lubricating oils. These compounds may be employed, too, as accelerators in rubber vulcanizers and as antioxidants to prevent the aging of finished rubber articles. The products are useful, too, as intermediates in the manufacture of other synthetic materials and in pharmaceutical and medicinal preparations.

It will be observed that we have accomplished the objects of our invention. We have provided a method of synthesizing high sulphur content compounds from olefins and more particularly from olefin gases.

It will be understood that certain features and subcombinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A method of synthesizing organic compounds with a high content of stably bound sulphur including the steps of converting an olefinic material into an olefinic dimercaptan and then oxidizing the dimercaptan.

2. A method of synthesizing organic compounds with a high content of stably bound sulphur including the steps of converting an olefinic material into an olefinic dimercaptan and oxidizing the said dimercaptan with chlorine.

3. A method of synthesizing organic compounds with a high content of stably bound sulphur including the steps of converting an olefinic material into an olefinic dimercaptan and oxidizing the said dimercaptan with sulphuryl chloride.

4. A method of synthesizing diethylene tetrasulphide from ethylene by converting the said ethylene to ethylene dimercaptan and oxidizing the latter by means of chlorine.

5. A method of synthesizing diethylene tetrasulphide from ethylene by converting the said ethylene to ethylene dimercaptan and oxidizing the said ethylene dimercaptan by means of sulphuryl chloride.

6. A method of synthesizing dimethyl, diethylene tetrasulphide from propylene by converting the said propylene to propylene dimercaptan and oxidizing the said propylene dimercaptan by means of chlorine.

7. A method of synthesizing dimethyl diethylene tetrasulphide from propylene by converting the said propylene to propylene dimercaptan and oxidizing the said propylene dimercaptan by means of sulphuryl chloride.

BERT H. LINCOLN.
GORDON D. BYRKIT.